(12) United States Patent
Gausrab

(10) Patent No.: US 8,801,092 B2
(45) Date of Patent: Aug. 12, 2014

(54) WIND DEFLECTOR

(71) Applicant: Dr. Ing. h.c.F. Porsche Aktiengesellschaft, Stuttgart (DE)

(72) Inventor: Klaus Gausrab, Renningen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 43 days.

(21) Appl. No.: 13/706,617

(22) Filed: Dec. 6, 2012

(65) Prior Publication Data

US 2013/0140858 A1 Jun. 6, 2013

(30) Foreign Application Priority Data

Dec. 6, 2011 (DE) .................... 10 2011 056 073

(51) Int. Cl.
*A47C 7/62* (2006.01)

(52) U.S. Cl.
USPC .............. 297/184.1; 297/188.03; 297/188.04; 296/85

(58) Field of Classification Search
USPC ............... 297/184.1, 188.03, 188.04, 188.06, 297/391, 397, 463.2; 296/85, 96.11, 96.21
See application file for complete search history.

(56) References Cited

U.S. PATENT DOCUMENTS

| | | | | |
|---|---|---|---|---|
| 925,141 A * | 6/1909 | Smith | ........................... | 280/159 |
| 2,514,082 A * | 7/1950 | Menrath | ......................... | 296/85 |
| 2,530,266 A * | 11/1950 | Quackenbush | ................. | 296/85 |
| 3,246,923 A * | 4/1966 | Turner | ....................... | 296/180.1 |
| 5,383,711 A * | 1/1995 | Houghteling | ................. | 297/397 |
| 5,415,457 A * | 5/1995 | Kifer | ......................... | 297/188.04 |
| 5,645,311 A * | 7/1997 | Emmer et al. | ............. | 296/180.5 |
| 5,810,424 A * | 9/1998 | Kuttner et al. | ............. | 296/180.1 |
| 6,088,855 A * | 7/2000 | Connolly | ........................... | 5/636 |
| 6,126,235 A * | 10/2000 | Grove | ......................... | 297/284.7 |
| 6,142,561 A * | 11/2000 | Pesta et al. | ............... | 297/188.04 |
| 6,623,075 B2 * | 9/2003 | Baloga et al. | .............. | 297/250.1 |
| 6,957,854 B1 * | 10/2005 | Seastrom | ................. | 297/188.04 |
| 7,980,623 B2 * | 7/2011 | Rossi | .......................... | 296/180.2 |
| 8,419,128 B1 * | 4/2013 | Leach | ....................... | 297/219.12 |
| 2008/0252111 A1 * | 10/2008 | Rothkop et al. | ......... | 297/188.04 |
| 2011/0193315 A1 * | 8/2011 | Kim | ............................. | 280/282 |
| 2013/0221712 A1 * | 8/2013 | Sanchez | .................... | 297/188.03 |

FOREIGN PATENT DOCUMENTS

| | | | |
|---|---|---|---|
| DE | 43 20 420 | 12/1994 | |
| DE | 4320420 A1 * | 12/1994 | ................ B60J 7/22 |
| DE | 195 16 921 | 11/1996 | |
| DE | 198 36 473 | 2/2000 | |
| DE | 102 32 060 | 2/2004 | |

OTHER PUBLICATIONS

German Search Report of Jul. 2, 2012.

* cited by examiner

*Primary Examiner* — David E Allred
(74) *Attorney, Agent, or Firm* — Gerald E. Hespos; Michael J. Porco; Matthew T. Hespos

(57) ABSTRACT

A wind deflector for a convertible vehicle is connected to a vehicle seat in the region of a headrest. The wind deflector is attached removably to the vehicle seat by connecting elements. A rear wall of the wind deflector extends around the headrest of the vehicle seat and is adjoined by, in each case, lateral air guiding elements with upright protective faces arranged running in the direction of travel and form between them, in a region in front of the headrest, a space that reduces a draft of air. In a further embodiment, the wind deflector can also be provided with a roof-shaped air guiding element.

15 Claims, 5 Drawing Sheets

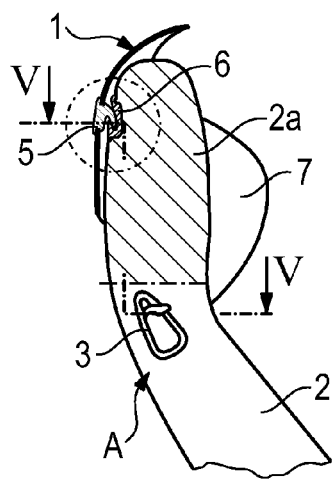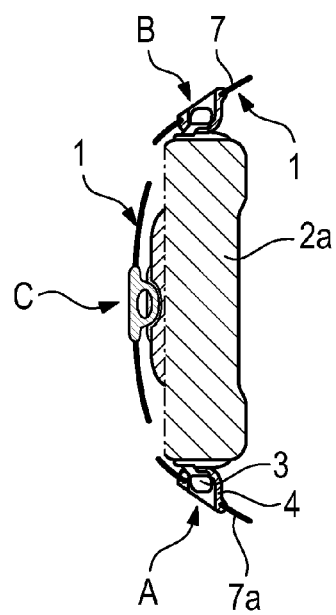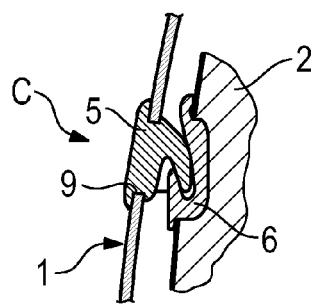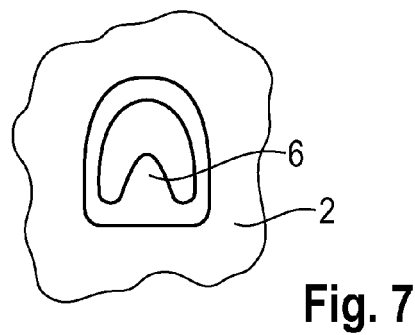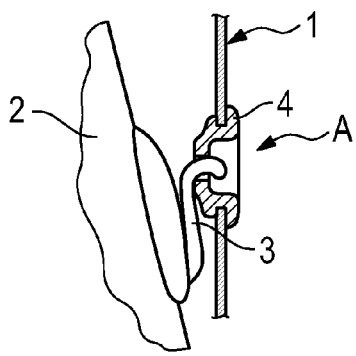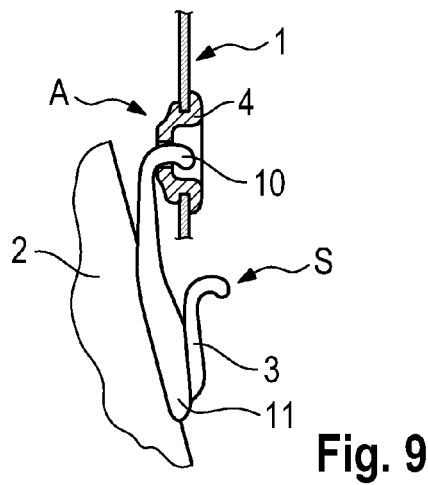

WIND DEFLECTOR

CROSS REFERENCE TO RELATED APPLICATION

This application claims priority under 35 USC 119 to German Patent Appl. No. 10 2011 056 073.4 filed on Dec. 6, 2011, the entire disclosure of which is incorporated herein by reference.

BACKGROUND OF THE INVENTION

1. Field of the Invention

The invention relates to a wind deflector arranged behind vehicle seats of a convertible vehicle.

2. Description of the Related Art

U.S. Pat. No. 3,246,923 discloses a semi-spherical shell adjustably attached to a backrest of a vehicle seat for deflecting a draft of air. The shell has lateral protective faces and an upper protective face that extends partially around the head of a driver or front seat passenger.

The object of the invention is to provide a wind deflector for an open motor vehicle, such as a convertible vehicle, to protect against undesired airflows for the head or the neck and neck region.

SUMMARY OF THE INVENTION

The invention relates to a shell-shaped wind deflector mounted on the vehicle seat to improve airflow conditions to the left and right of the head of the driver or front seat passenger. Each wind deflector is arranged in the region of a headrest or a head receptacle on the vehicle seat and is attached thereto by connecting elements on the sides and at the rear of the seat. The shell-shaped wind deflector comprises a rear wall that extends around the headrest of the vehicle seat. The rear wall of each wind deflector is adjoined by lateral air guiding elements with upright protective faces arranged to run in the direction of travel. A receptacle space is formed between the lateral air guiding elements, in a region in front of the headrest and reduces a draft of air for the head of the seated person.

An upper roof-shaped air guiding element may adjoin the rear wall of the wind deflector and has a protective face arranged approximately in a horizontal plane to extend over the headrest in the direction of travel. The protective faces of the wind deflector are oriented toward the front on both sides to prevent the air stream coming from the side and from the rear from impacting directly on the neck and head region of the driver or front seat passenger. Thus, the flow conditions in the neck region to the left and right of the head are improved. The lateral protective faces of the wind deflector substantially reduce the lateral draft of air in the transverse direction relative to the direction of travel and in the direction of the driver or front seat passenger. Additionally, the upper roof-shaped protective face impedes an air stream coming from above in the transverse direction relative to the direction of travel.

The windbreak preferably is a single-piece hard shell that is shaped around the headrest or the vehicle seat. Additionally, the rear wall extends around the vehicle seat to form a coherent, single-piece structural unit with the lateral air guiding elements. The rear wall also preferably forms a coherent, single-piece structural unit with the lateral air guiding elements and the upper, roof-shaped air guiding element. As a result, the wind deflector is a dimensionally stable half shell, and a wide variety of coloring is possible, such as in a vehicle color, CFK look etc. The accessory can be enhanced as desired by a combination with aluminum or other materials.

The lateral air guiding elements of the wind deflector preferably have protective faces in the shape of an ear. The protective faces preferably extend into the protective face of the upper roof-shaped air guiding element and have a concavely running arcuate edge. The two lateral air guiding elements diverge from one another, when viewed in the direction of travel. Additionally, the air guiding elements have a V-shape and the protective faces of the air guiding elements run in a protruding fashion with respect to the headrest and surround the head region or the headrest of the vehicle seat laterally. This configuration of the wind deflector provides optimum lateral and upper enclosure of the head of the seated person so that the air flow can be kept away from the head and the neck, as far as possible, and disruptive drafts of air are avoided.

The wind deflector can be connected to the vehicle seat by the connecting elements at least at three attachment points. One attachment point for the connecting element is on the rear side of the seat, and two further attachment points for the connecting elements are located on each side of the vehicle seat. The connecting elements may be hooks attached to the seat. The hooks project into openings in elastic hook receptacles that are connected permanently to the wind deflector, and in the mounted state are under play-free prestress between the hook and the hook receptacle. An advantage of these attachment points is that they already are provided on a series production basis as clothes hooks on the vehicle seat and therefore no new attachment point has to be provided. The elastic hook receptacles can be attached as an attachment component by circumferential U-shaped profile grooves in receptacle profiles in the wall of the wind deflector. The U profiles preferably are made of an elastic material, such as rubber to decouple vibrations.

A clothes hook attached to the rear side of the vehicle seat may serve as a rear connecting element for the wind deflector, and seat adjustment levers which on the side of the vehicle seat may form lateral hooks as lateral connecting elements. The hooks of the lateral connecting elements can also be integrated into nonmovable frame components of the seat release lever or attached to the seat as independent components.

The invention offers a significant advantage over conventional wind deflectors that are attached to the bodywork or to the interior fittings because an additional side protection is formed by protective faces that project forward on both sides next to the seat. The roof-shaped air guiding element provides additional protection from above. Additionally, the attachment to the seat keeps the distance of the wind deflector from the seated person constant irrespective of the seating position in the vehicle.

An exemplary embodiment is illustrated in the drawings and will be explained in more detail below.

BRIEF DESCRIPTION OF THE DRAWINGS

FIG. 4 is a longitudinal section through the wind deflector with a hook as a rear connecting point.

FIG. 5 is a stepped section along the line V-V in FIG. 4 through the lateral and rear connecting points on the seat.

FIG. 6 is an enlarged sectional illustration according to FIG. 4 through a hook arranged on the rear side of the seat.

FIG. 7 is a plan view of the hook on the seat according to FIG. 6.

FIG. 8 is an enlarged illustration of the lateral connecting elements.

FIG. 9 shows an attachment hook integrated in a frame component of a seat release means.

DETAILED DESCRIPTION OF THE PREFERRED EMBODIMENT

Figure 1:
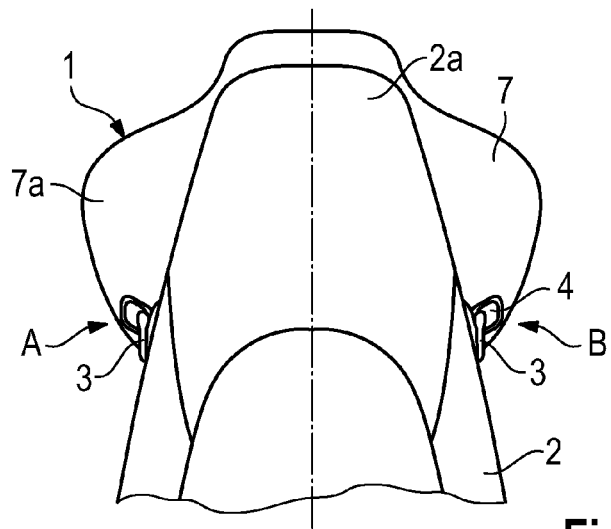
FIG. 1 is a front view of a wind deflector on the seat.
Figure 2:
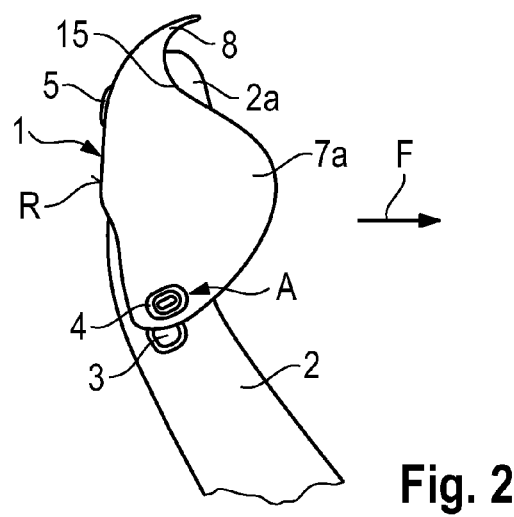
FIG. 2 is a side view of the wind deflector on the seat.
Figure 3:
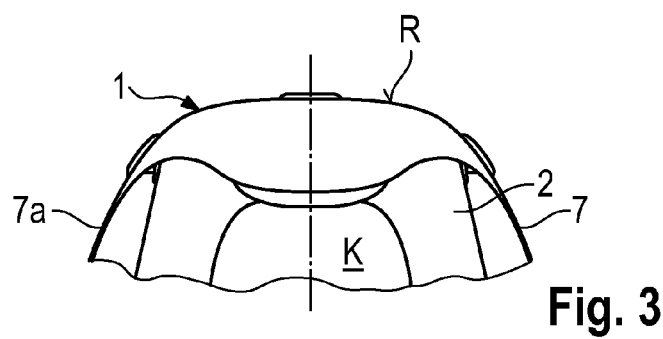
FIG. 3 is a plan view of the wind deflector on the seat.

A wind deflector 1 for a convertible vehicle is arranged in the region of a headrest 2a or the head region of each vehicle seat 2. Attachment to the seat 2 is carried out by connecting elements A, B and C at predetermined attachment points on the sides and at a rear side of the seat 2.

The wind deflector 1 is in the form of a shell and comprises a rear wall R that extends around the headrest 2a of the seat 2. The rear wall R is adjoined by lateral air guiding element 7, 7a with upright protective faces arranged to run in the direction F of travel. A space K between the two air guiding elements 7, 7a in front of the headrest 2a accommodates a head of a driver or a front seat passenger and reduces a draft of air.

The wind deflector 1 has an upper roof-shaped air guiding element 8 that joins the rear wall R. The upper roof-shaped air guiding element 8 has a protective face arranged approximately in a horizontal plane and extends over the headrest 2a in the direction F of travel.

The wind deflector 1 preferably is composed of a single-piece hard shell that is shaped around the seat 2 or around the headrest 2a. The rear wall R and the lateral air guiding elements 7, 7a form a coherent, single-piece structural unit. The rear wall R likewise forms a coherent, single-piece structural unit with the lateral air guiding elements 7, 7a and the upper roof-shaped air guiding element 8.

The lateral air guiding elements 7, 7a have protective faces in the shape of an ear and that extend with a concavely running arcuate edge 15 into the protective face of the upper roof-shaped air guiding element 8.

The two lateral air guiding elements 7, 7a are arranged to diverge from one another, when viewed in the direction F of travel and have a V-shape. The air guiding elements 7, 7a run in a protruding fashion with respect to the headrest 2a and surround the head region of the seat 2.

A hook 6, as a connecting element C, is connected permanently to the center of the rear side of the seat 2. The hook 6 is illustrated in detail in FIGS. 6 and 7. The hook 6 serves as a clothes hook in most sport cars series of an existing make of vehicle. A hooking-in contour of a hook receptacle 5 is provided in the center of the wind deflector 1 and is hooked into the hook 6 from above to below during mounting of the wind deflector 1 on the seat 2. The hooking-in contour preferably is composed of an elastic material, such as rubber, to elastically decouple vibrations. As a result, the hooking-in contour can be formed as one component which, similar to a grommet made of rubber, has a circumferential U profile 9 for attachment in a correspondingly profiled opening in the wind deflector 1.

Connecting elements A and B for the wind deflector 1 are provided on the respective sides of the seat 2. The room for maneuver in terms of configuration is very large as in the case of the rear attachment. A clip/snap-in connection, pressure knob, screw connection or hook-connection all are conceivable. Attachment by a hook 3 already provided in the vehicle seat is illustrated.

FIGS. 5 and 8 show the lateral connecting elements A and B in section. The hook 3 projects through an opening in an elastic hook receptacle 4 that is similar to the rear attachment point and can be attached as an attachment component in a lateral receptacle profile of the wind deflector 1. To avoid vibration noises, the opening contour of the hook receptacle 4 is configured so that the lateral hook 3, which is fixed to the seat, is plugged into the opening under prestress. The mounting of the wind deflector 1 on the seat 2 is made possible by virtue of the fact that the wind deflector 1 is widened laterally in the region of its elasticity, and the opening holes of the two hook receptacles 4 are guided over the lateral hooks 3. Thus, the wind deflector 1 rapidly can be mounted on or dismounted from the seat 2 without tools.

The above-described wind deflector 1 avoids additional components on the seat 2. The lateral attachment hook 3 can be provided by the seat release levers, which, like the rear attachment hook 6, are already present in the above-described vehicle seats 2. As a result, the wind deflector 1 can be an accessory that can be added without additional adaptation measures on the seat 2.

To release the seat 2 with the wind deflector 1 mounted, the wind deflector 1 is moved up together with the hooks 3, 6 or 10. The seat release functions primarily when folding the seat forward to facilitate entry into the rear seats. This function rarely is required with two-seat convertibles and justifies the limitation with respect to the seat release.

This functional restriction can be avoided if the wind deflector is not secured to the hook 3 of the seat release. To avoid an additional attachment device on the seat 2, there is a possibility of integrating an attachment hook 10 into a non-movable frame component 11 of the seat release, as shown in FIG. 9.

Figure 10:
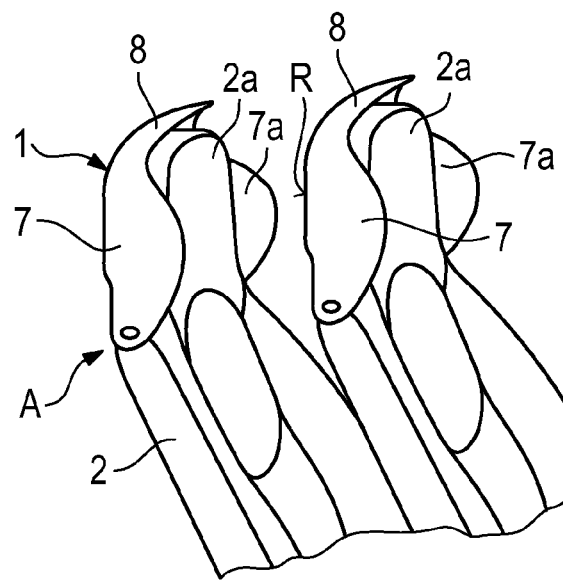
FIG. 10 is an oblique view of a wind deflector with an upper, roof-shaped air guiding element.
Figure 11:
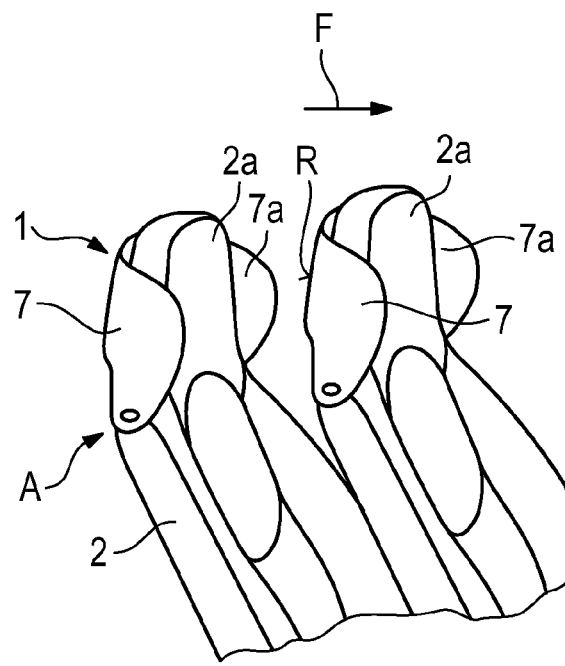
FIG. 11 is an oblique view of a variant of a wind deflector without an upper, roof-shaped air guiding element.

The high degree of freedom of maneuver in terms of configuration in respect of design and use of material is limited only in terms of an overall round view. Thus, the roof-shaped air guiding element 8 produces a sporty appearance when viewed from the rear, similar to a helmet-like protector. Without this additional protection region, the appearance of a shell-shaped sports seat may be obtained. FIGS. 10 and 11 are oblique views that show wind break shapes with and without a roof-shaped air guiding element 8.

Figure 12:
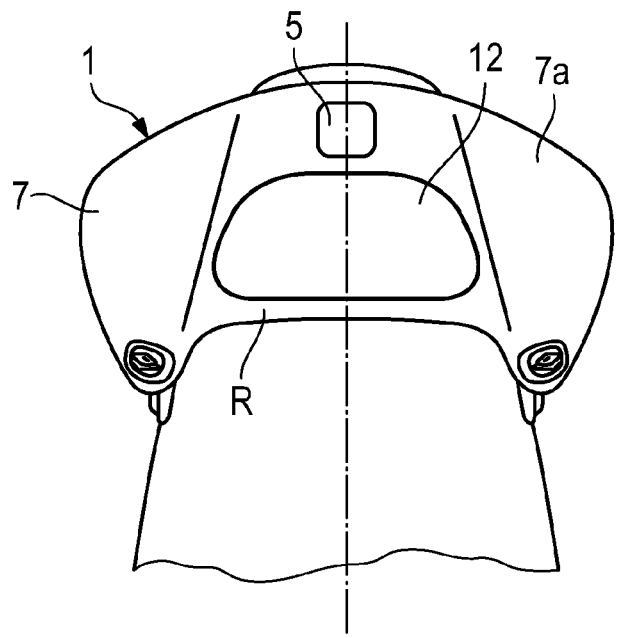
FIG. 12 is a view from the rear of the seat and of the wind deflector with a first alternative embodiment of the rear wall of the wind deflector.
Figure 13:
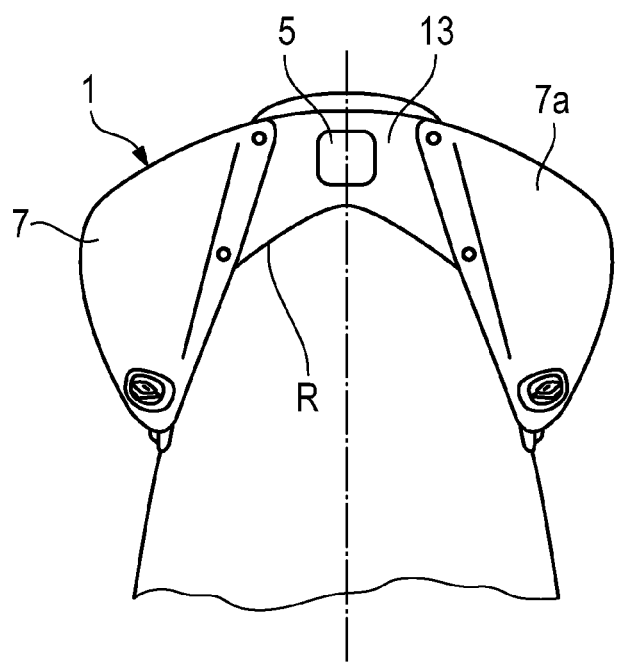
FIG. 13 is a view corresponding to FIG. 12 with a wind deflector constructed in three parts.

The rear wall R of the wind deflector 1 can be a closed wall or can have large or small openings 12 or a structured profile, as shown in FIG. 12. In addition, the wind deflector 1 can have three pieces, as shown in FIG. 13 and can have a rear connecting element 13 to which the lateral air guiding elements 7, 7a and the roof-shaped air guiding element 8 are attached.

Figure 14:
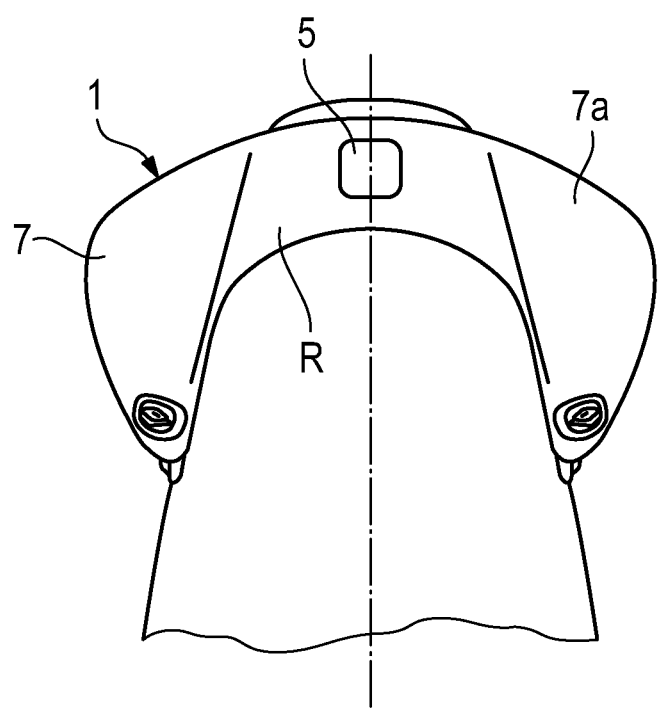
FIG. 14 is a view corresponding to FIG. 12 with a further alternative embodiment of the rear wall of the wind deflector.

The wind deflector 1 is removable. According to FIG. 14, the lateral air guiding elements 7, 7a of the wind deflector 1 have a larger vertical extent than the connecting rear wall R.

What is claimed is:

1. A wind deflector for a convertible vehicle arranged in a region of a headrest of a vehicle seat, the wind deflector being attached to the vehicle seat by connecting elements on sides and a rear of the seat, the wind deflector comprising a one piece hard shell with a rear wall that extends to a rear of the headrest, lateral air guiding elements adjoined to the rear wall, and an upper roof-shaped air guiding element joined to the rear wall and having a protective face extending over the headrest in a travel direction of the vehicle, the lateral air guiding elements having upright protective faces arranged in a travel direction of the vehicle and a space being defined between the lateral air guiding elements and in front of the headrest for reducing a draft of air, the lateral air guiding elements and the upper roof shaped air guiding element having convexly curved front edges and the wind deflector having concavely curved front edges extending between the upper roof shaped air guiding element and the lateral air guiding elements, the convexly curved front edges of the lateral air guiding elements projecting more forward than the convexly curved front edge of the upper roof shaped air guiding element and the lateral air guiding elements having a larger vertical extent than a connecting rear wall that adjoins the lateral air guiding elements.

2. The wind deflector of claim 1, wherein the wind deflector has at least three attachment points configured to be connected to the vehicle seat by the connecting elements.

3. The wind deflector of claim 2, wherein the at least three attachment points comprise a rear attachment point connectable to a connecting element on a rear side of the seat, and two side attachment points connectable respectively to connecting elements arranged on opposite sides of the vehicle seat.

4. The wind deflector of claim 1, wherein the connecting elements are hooks attached to the vehicle seat.

5. A wind deflector for a convertible vehicle arranged in a region of a headrest of a vehicle seat, the wind deflector being attached to the vehicle seat by connecting elements on sides and a rear of the seat, the wind deflector comprising a shell with a rear wall that extends around the headrest and lateral air guiding elements adjoined to the rear wall, the lateral air guiding elements having upright protective faces arranged in a travel direction of the vehicle and a space being defined between the lateral air guiding elements and in front of the headrest for reducing a draft of air, wherein the wind deflector has openings and elastic hook receptacles permanently connected to the wind deflector at the openings, hooks projecting from the vehicle seat and into the openings in the elastic hook receptacles to define a play-free prestress between each of the hooks and the respective hook receptacle.

6. The wind deflector of claim 5, wherein the wind deflector has an upper roof-shaped air guiding element joined to the rear wall and having a protective face arranged in a substantially horizontal plane and extending over the headrest in the travel direction of the vehicle.

7. The wind deflector of claim 6, wherein the wind deflector is a unitary hard shell substantially conforming to a shape of the headrest or the vehicle seat.

8. The wind deflector of claim 6, wherein the rear wall, the lateral air guiding elements and the upper roof-shaped air guiding element define an integral structural unit extending around the vehicle seat.

9. The wind deflector of claim 6, wherein the lateral air guiding elements have protective faces in the shape of an ear, each of the protective faces having a concave arcuate edge extending into the protective face of the upper roof-shaped air guiding element.

10. The wind deflector of claim 5, wherein the rear wall and the lateral air guiding elements define an integral structural unit extending around the vehicle seat.

11. The wind deflector of claim 5, wherein the two lateral air guiding elements diverge from one another when viewed in the travel direction, the air guiding elements having a V-shaped form and the protective faces of the air guiding elements protruding with respect to the headrests and surrounding the headrest of the vehicle seat laterally.

12. The wind deflector of claim 5, wherein the elastic hook Receptacles have circumferential U-shaped profile grooves engaged with the wind deflector at the respective openings.

13. A wind deflector for a convertible vehicle arranged in a region of a headrest of a vehicle seat, the wind deflector being attached to the vehicle seat by connecting elements on sides and a rear of the seat, the wind deflector comprising a shell with a rear wall that extends around the headrest and lateral air guiding elements adjoined to the rear wall, the lateral air guiding elements having upright protective faces arranged in a travel direction of the vehicle and a space being defined between the lateral air guiding elements and in front of the headrest for reducing a draft of air, wherein the connecting elements include a clothes hook attached to the rear side of the vehicle seat.

14. The wind deflector for a convertible vehicle arranged in a region of a headrest of a vehicle seat, the wind deflector being attached to the vehicle seat by connecting elements on sides and a rear of the seat, the wind deflector comprising a shell with a rear wall that extends around the headrest and lateral air guiding elements adjoined to the rear wall, the lateral air guiding elements having upright protective faces arranged in a travel direction of the vehicle and a space being defined between the lateral air guiding elements and in front of the headrest for reducing a draft of air, wherein the connecting elements include seat adjustment levers on the sides of the vehicle seat.

15. The wind deflector of claim 14, wherein the connecting elements are integrated into non-movable frame parts of the seat release lever.

* * * * *